United States Patent
Cardin et al.

(10) Patent No.: US 10,128,642 B2
(45) Date of Patent: Nov. 13, 2018

(54) FOLDABLE CABLE TRAY

(71) Applicant: Thomas & Betts International LLC, Wilmington, DE (US)

(72) Inventors: Daniel Cardin, Ste-Julie (CA); Mathew Thomas, Memphis, TN (US); Tyler Nash, Batesville, MS (US); Cong Thanh Dinh, Collierville, TN (US)

(73) Assignee: Thomas & Betts International LLC, Wilmington, DE (US)

( * ) Notice: Subject to any disclaimer, the term of this patent is extended or adjusted under 35 U.S.C. 154(b) by 0 days.

(21) Appl. No.: 15/610,976

(22) Filed: Jun. 1, 2017

(65) Prior Publication Data
US 2017/0358910 A1 Dec. 14, 2017

Related U.S. Application Data

(60) Provisional application No. 62/347,280, filed on Jun. 8, 2016.

(51) Int. Cl.
| | |
|---|---|
| *F16L 3/00* | (2006.01) |
| *H02G 3/04* | (2006.01) |
| *F16L 3/26* | (2006.01) |
| *E06C 1/383* | (2006.01) |
| *H02G 3/06* | (2006.01) |

(52) U.S. Cl.
CPC .............. *H02G 3/0456* (2013.01); *F16L 3/26* (2013.01); *E06C 1/383* (2013.01); *H02G 3/0608* (2013.01)

(58) Field of Classification Search
CPC ........ H02G 3/30; H02G 3/0437; F16L 3/1075

USPC ................................ 248/65, 68.1, 73, 74.1
See application file for complete search history.

(56) References Cited

U.S. PATENT DOCUMENTS

| | | |
|---|---|---|
| 3,414,081 A | 12/1968 | Wedvik |
| 3,598,349 A | 8/1971 | Drake |
| 4,463,829 A | 8/1984 | Grin |
| 4,678,060 A | 7/1987 | Pugliese |
| 5,060,757 A | 10/1991 | Wyche |
| 5,060,892 A | 10/1991 | Dougherty |
| 5,201,488 A | 4/1993 | Hadbavny |
| 5,465,929 A | 11/1995 | Dooley |
| 5,593,115 A | 1/1997 | Lewis |
| 6,070,742 A | 6/2000 | McAnally et al. |
| 6,129,179 A | 10/2000 | Rooney et al. |
| 6,402,096 B1 | 6/2002 | Ismert et al. |
| 6,457,559 B1 | 10/2002 | Schlueter et al. |
| 6,536,558 B2 | 3/2003 | Price |

(Continued)

FOREIGN PATENT DOCUMENTS

| | | |
|---|---|---|
| CN | 1995684 A | 7/2007 |
| CN | 203850763 U | 9/2014 |

(Continued)

*Primary Examiner* — Steven M Marsh
(74) *Attorney, Agent, or Firm* — Taft Stettinius & Hollister LLP

(57) ABSTRACT

The present invention relates to a foldable cable tray configured for ease of transportation and for storage. The foldable cable tray includes a first side rail, a second side rail, a plurality of rungs movably connected to the first and second side rails to transit the foldable cable tray between unfolded and folded positions, and a locking device configured to lock each of the plurality of rungs to the first and second side rails when the foldable cable tray is in the unfolded position.

16 Claims, 7 Drawing Sheets

(56) References Cited

U.S. PATENT DOCUMENTS

| | | | |
|---|---|---|---|
| 6,547,192 B2* | 4/2003 | Rinderer | H02G 3/0608 |
| | | | 248/49 |
| 6,585,195 B2 | 7/2003 | Wentworth et al. | |
| 6,598,753 B2 | 7/2003 | Ming | |
| 6,644,601 B2 | 11/2003 | Aussiker | |
| 6,715,584 B2 | 4/2004 | Ostyn | |
| 6,739,795 B1 | 5/2004 | Haataja et al. | |
| 7,383,634 B2 | 6/2008 | Haataja et al. | |
| 8,186,634 B2 | 5/2012 | Chen et al. | |
| 8,540,090 B2 | 9/2013 | Caveney et al. | |
| 8,555,558 B1 | 10/2013 | Trout et al. | |
| 8,622,175 B2 | 1/2014 | Nielsen | |
| 8,839,906 B1 | 9/2014 | Furr | |
| 8,844,212 B1 | 9/2014 | Trout et al. | |
| 8,882,055 B2 | 11/2014 | Yang et al. | |
| 8,959,843 B2 | 2/2015 | Trout et al. | |
| 9,022,326 B2 | 5/2015 | Brown et al. | |
| 9,068,394 B1 | 6/2015 | Geiselman, III | |
| 9,706,680 B2* | 7/2017 | Chang | H05K 7/183 |
| 2002/0158170 A1* | 10/2002 | Wentworth | G02B 6/4461 |
| | | | 248/49 |
| 2006/0113433 A1* | 6/2006 | Chen | H05K 7/1491 |
| | | | 248/70 |
| 2009/0078834 A1* | 3/2009 | Chen | H01R 9/2416 |
| | | | 248/70 |
| 2010/0133390 A1* | 6/2010 | Lange | H02G 3/0418 |
| | | | 248/65 |
| 2010/0181440 A1* | 7/2010 | Larsen | F16L 3/015 |
| | | | 248/68.1 |
| 2012/0037453 A1 | 2/2012 | Flecha | |

FOREIGN PATENT DOCUMENTS

| | | |
|---|---|---|
| DE | 91 15 650.5 U1 | 3/1992 |
| EP | 3 255 746 A1 | 12/2017 |
| GB | 1 253 577 A | 11/1971 |
| NL | 7904309 A | 12/1980 |
| WO | 2008/120247 A1 | 10/2008 |

* cited by examiner

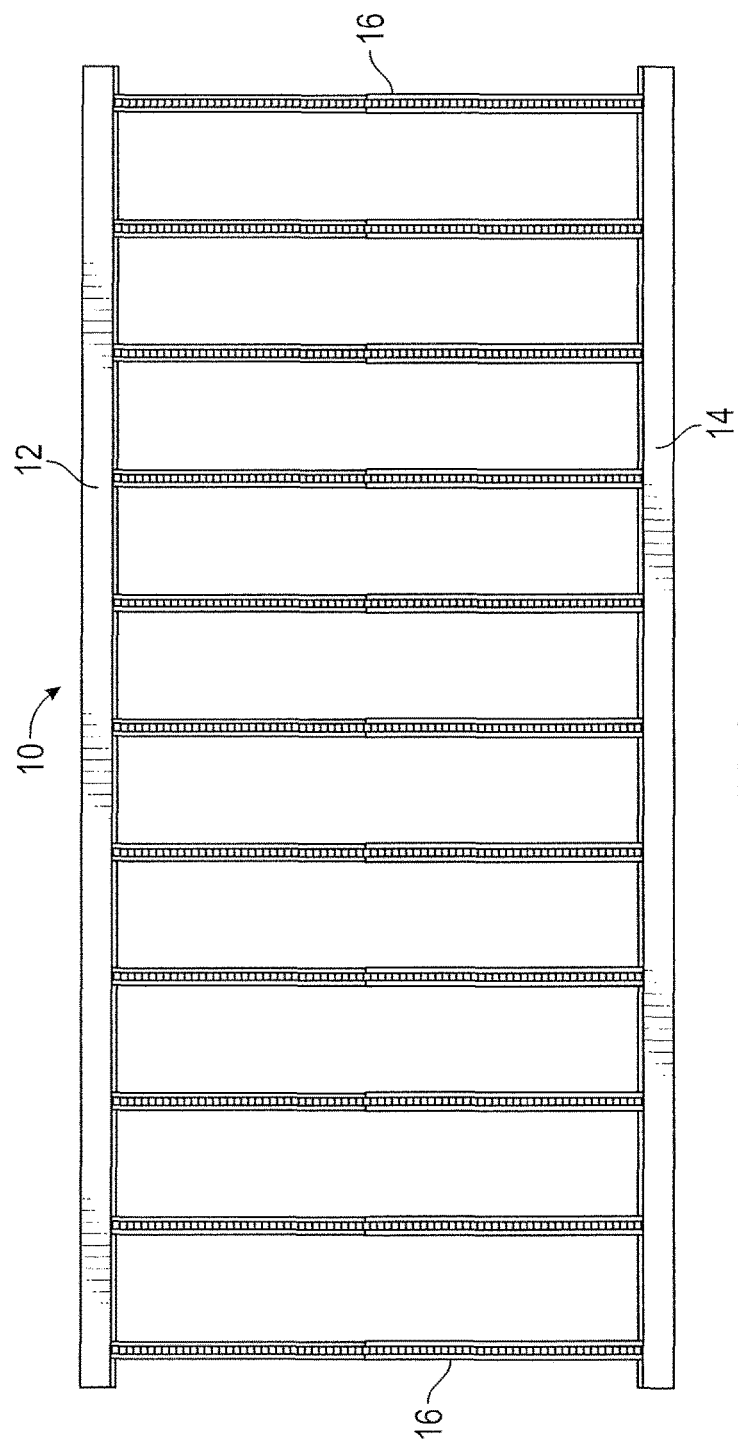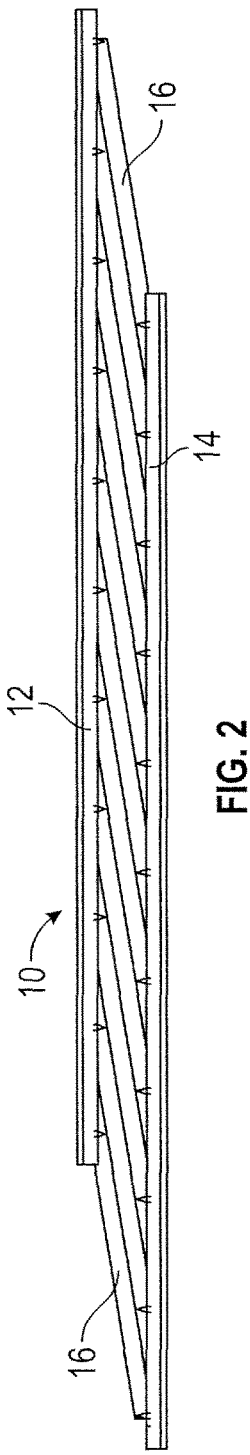

FOLDABLE CABLE TRAY

CROSS REFERENCE TO RELATED APPLICATION

This application claims priority to U.S. Provisional Patent Application No. 62/347,280, filed on Jun. 8, 2016, the contents of which are incorporated herein by reference in its entirety.

FIELD OF THE INVENTION

The present invention relates to cable trays, and more particularly, to foldable cable trays configured for ease of transportation and for storage.

BACKGROUND OF THE INVENTION

A cable tray supports electric cables used for power distribution and communication in the wiring of various facilities or commercial buildings. Generally, each of cable trays currently available in the market includes a pair of parallel side rails and a plurality of transverse rungs secured between the parallel side rails to fix the spacing between them. These rungs are typically welded or bolted to the side rails in a fixed manner such that there cannot be any movement between the rungs and side rails. Because of this rigid design and configuration of the available cable trays, shipping of the cable trays is normally performed by stacking the cable trays one over the other, which creates large amounts of air volume. Thus, this shipping method is inefficient and not desirable.

Accordingly, although various cable trays are available currently in the market, further improvements are possible to efficiently transport the cable trays.

SUMMARY OF THE INVENTION

According to an embodiment of the present invention, a foldable cable tray includes a first side rail, a second side rail, the second side rail parallel to the first side rail, a plurality of rungs movably connected to the first and second side rails to transit the foldable cable tray between unfolded and folded positions, and a locking device configured to lock each of the plurality of rungs to the first and second side rails when the foldable cable tray is in the unfolded position.

According to a method aspect, a method of installing a foldable cable tray includes unfolding the foldable cable tray, adjusting a plurality of rungs to set a desired width of the foldable cable tray by retracting or extending the plurality of rungs, and applying a locking device to affix the plurality of rungs to side rails.

These and other aspects of the present invention will be better understood in view of the drawings and following detailed description.

BRIEF DESCRIPTION OF THE DRAWINGS

FIG. 1 is a perspective view of the foldable cable tray, according to an embodiment of the present invention, in an unfolded position;

FIG. 2 is a perspective view of the foldable cable tray in FIG. 1 in a folded position;

DETAILED DESCRIPTION OF PREFERRED EMBODIMENTS

Figure 3:
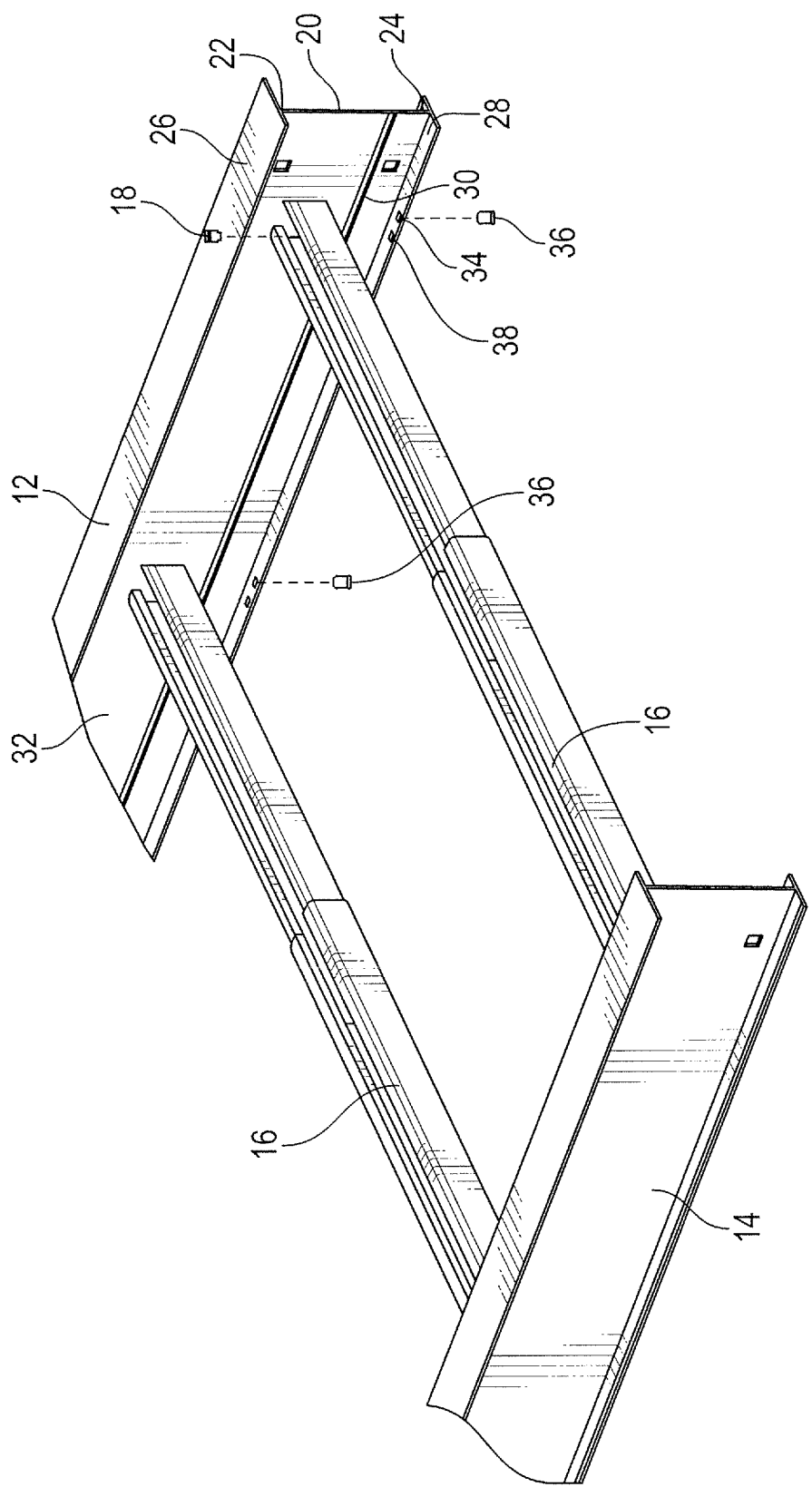
FIG. 3 a partially-exploded perspective view of the foldable cable tray in FIG. 1.

According to an embodiment of the present invention, referring to FIGS. 1-3, a foldable cable tray 10 includes parallel first and second side rails 12, 14, a plurality of rungs 16 adapted to connect between the first and second side rails 12, 14 to fix a spacing therebetween, and a locking device 18. The foldable cable tray 10 has a movable design/configuration between the plurality of rungs 16 and the first and second side rails 12, 14 that allows the foldable cable tray 10 to transit between unfolded (FIG. 1) and folded (FIG. 2) positions.

Referring to more particularly FIG. 3, each of the first and second side rails 12, 14 includes a generally vertical web 20 having first and second ends 22, 24, horizontal upper and lower flanges 26, 28 connected and separated by the web 20, and a shoulder 30 protruding outwardly from an inner surface 32 of the web 20. The upper and lower flanges 26, 28 are disposed at first and second ends 22, 24 of the web 20, respectively, and are substantially perpendicular to the first and second side rails 12, 14, respectively.

Referring again to FIG. 3, in the depicted embodiment, the lower flange 28 includes a plurality of lower flange mounting holes 34 through which a movement device 36 may be inserted from the bottom of each of the plurality of lower flange mounting holes 34 to provide pivotal movement for the plurality of rungs 16. The movement device 36 could be a riveted joint or other device suitable for providing pivotal movement. The plurality of lower flange mounting holes 34 in the lower flange 28 are uniformly spaced apart at a predetermined interval across the entire length of the lower flange 28.

In addition, a plurality of lower flange locking holes 38 are defined in the lower flange 28 each of which is positioned closely adjacent to each corresponding lower flange mounting hole 34. When the foldable cable tray 10 is in the unfolded position, the locking device 18, as will be describe in greater detail below, may be inserted through any one of the plurality of lower flange locking holes 38 to secure the plurality of rungs 16 to the first and second side rails 12, 14 and prevent the plurality of rungs 16 from moving. Preferably, the locking device 18 is applied to the first and last rungs to secure the plurality of rungs 16. Similar to the plurality of lower flange mounting holes 34, the plurality of lower flange locking holes 38 are uniformly spaced apart at a predetermined interval across the entire length of the lower flange 28.

The shoulder 30 is formed integrally from the inner surface 32 of the web 20 between the upper and lower flanges 26, 28 and extends across the entire length of the web 20. Spacing between the shoulder 30 and lower flange 28 is dimensioned to closely fit end portions of the plurality of rungs 16 therebetween.

Figure 4:
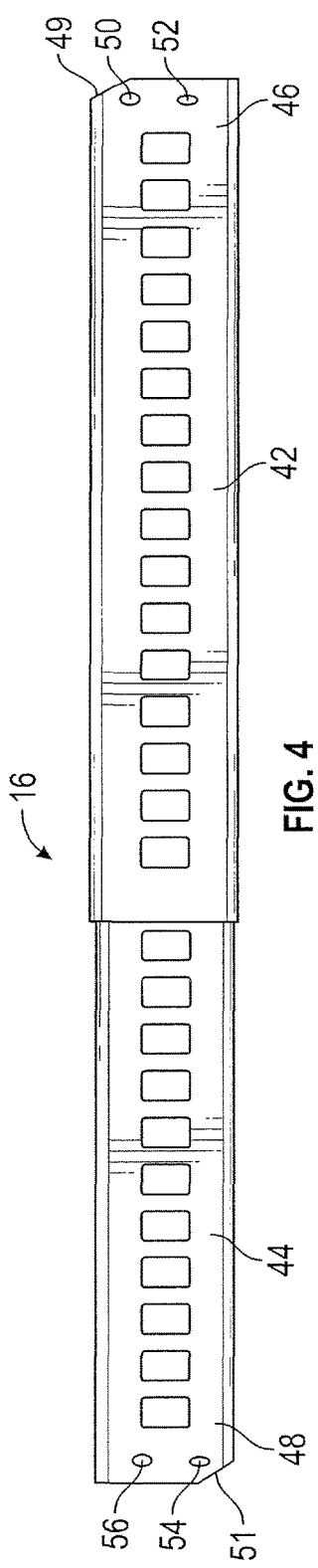
FIG. 4 is a perspective view of the rung in FIG. 1.

Referring to FIG. 4, in the depicted embodiment, each of the plurality of rungs 16 includes a first rung member 42, a second rung member 44 and a rung locking device a first rung member 42, a second rung member. Contours of the first and second rung members 42, 44 are substantially identical except that the second rung member 44 is slightly smaller, thereby allowing the second rung member 44 to be fitted within the first rung member 42 and slidable therewithin. In other words, the second rung member 44 is slidably mounted for telescopic movement within the first rung member 42 such that it can be retracted or extended, as desired. Advantageously, this telescopic movement of the plurality of rungs 16 allows the foldable cable tray 10 to have a variable width during its installation. Once a desired width is set, the rung locking device (not shown) may be applied to secure the first and second rung members 42, 44 in a fixed manner. In an alternate embodiment, each of the plurality of rungs is an elongated channel extending between opposite ends (not shown).

Referring to FIGS. 3 and 4, each of the plurality of rungs 16 is movably attached at a first end portion 46 of the first rung member 42 and a second end portion 48 of the second rung member 44 to the first and second side rails 12, 14, respectively. This movable connection with the first and second side rails 12, 14 allows each rung 16 to have pivotal movement therewith. The first and second end portions 46, 48 include a first angular cut 49 and a second angular cut 51, respectively, to allow each of the plurality of rungs 16 to pivotally move with the side rails 12, 14. As stated above, the pivotal movement permits the foldable cable tray 10 to transit between the unfolded and folded positions. When the foldable cable tray 10 is in the unfolded position, the plurality of rungs 16 are substantially perpendicular to each of the first and second side rails 12, 14, whereas in the folded position the plurality of rungs 16 are near parallel to each of the first and second side rails 12, 14.

A first rung mounting hole 50 and a first rung locking hole 52 are defined at the first end portion 46 of the first rung member 42, and a second rung mounting hole 54 and a second rung locking hole 56 are defined at the second end portion 48 of the second rung member 44. To secure each of the plurality of rungs 16, the first and second rung mounting holes 50, 54 are aligned with one of the plurality of lower flange mounting holes 34 in the first and second side rails 12, 14, respectively. The movement device 36 is then inserted through the aligned holes 34, 50, 54 to movably attach each of the plurality of rungs 16 and enable pivotal movement of each of the plurality of rungs 16 therewith.

Figure 5:
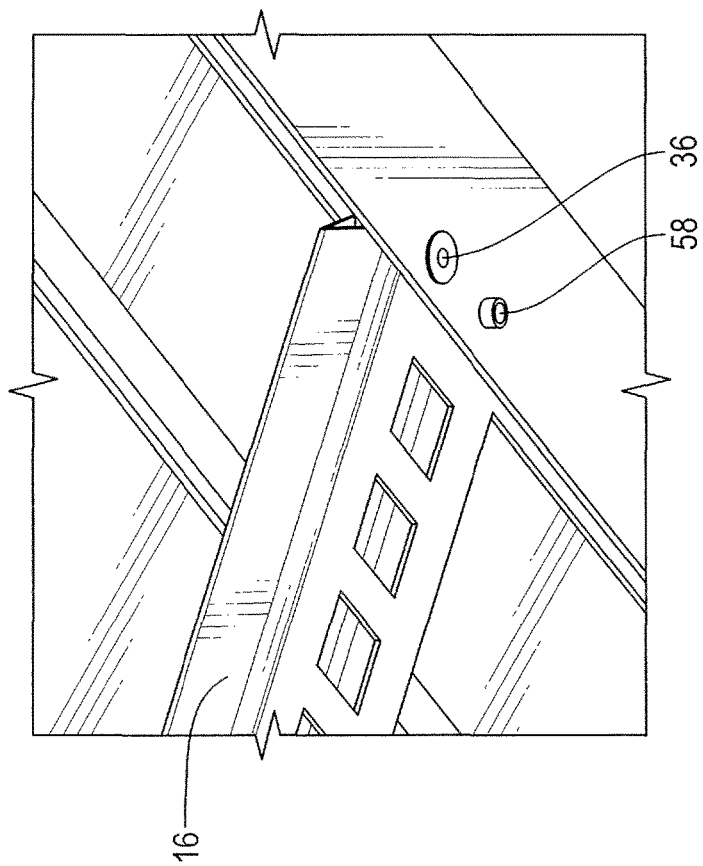
FIG. 5 is a perspective view of the foldable cable tray of FIG. 1 with the locking pin as a locking device.
Figure 6:
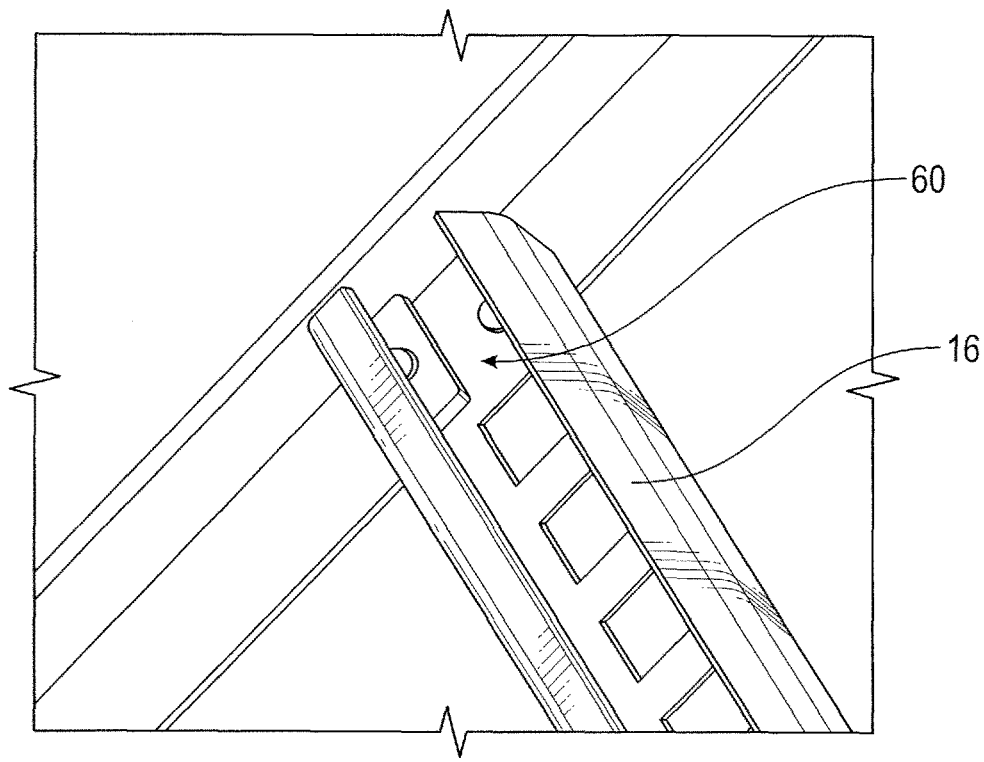
FIG. 6 is a perspective view of the foldable cable tray with the bolt and nut as a locking device.
Figure 7:
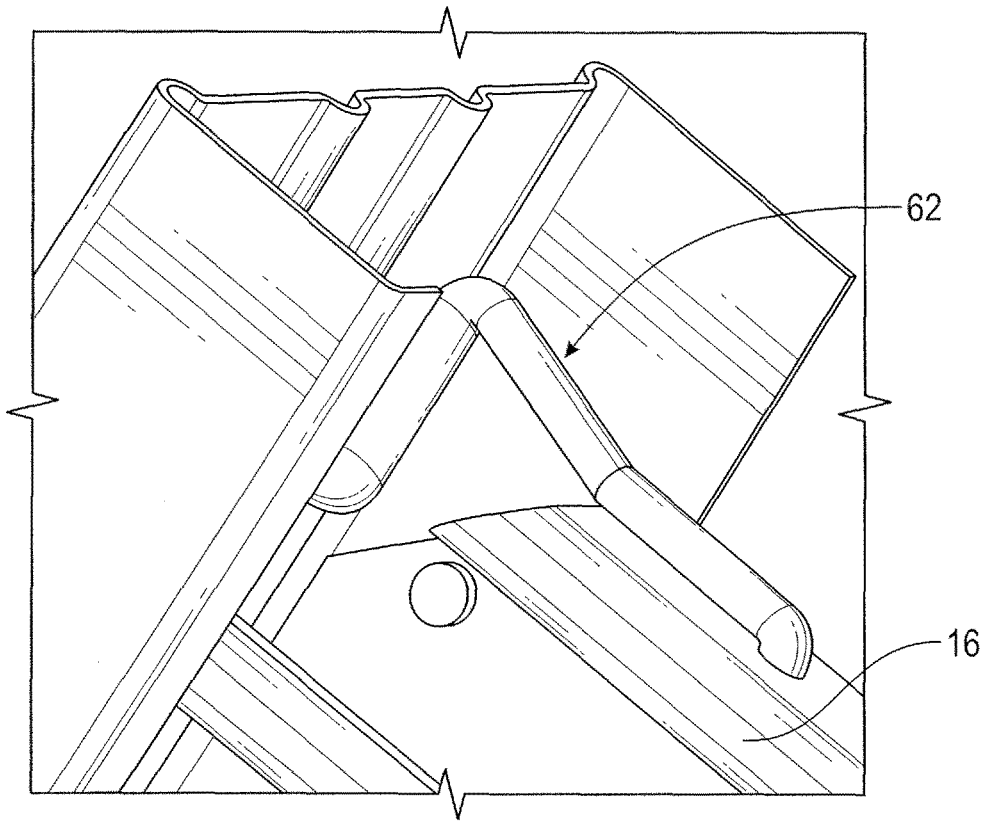
FIG. 7 is a perspective view of the foldable cable tray with the locking rod as a locking device.
Figure 8:
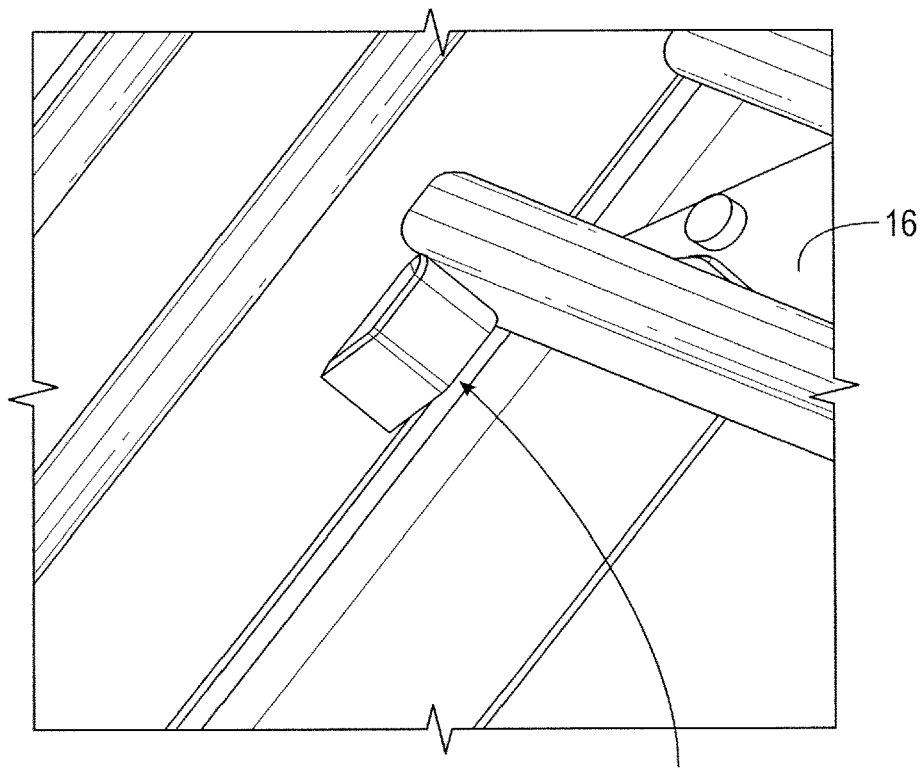
FIG. 8 is a perspective view of the foldable cable tray of with the locking tabs as a locking device.
Figure 9:
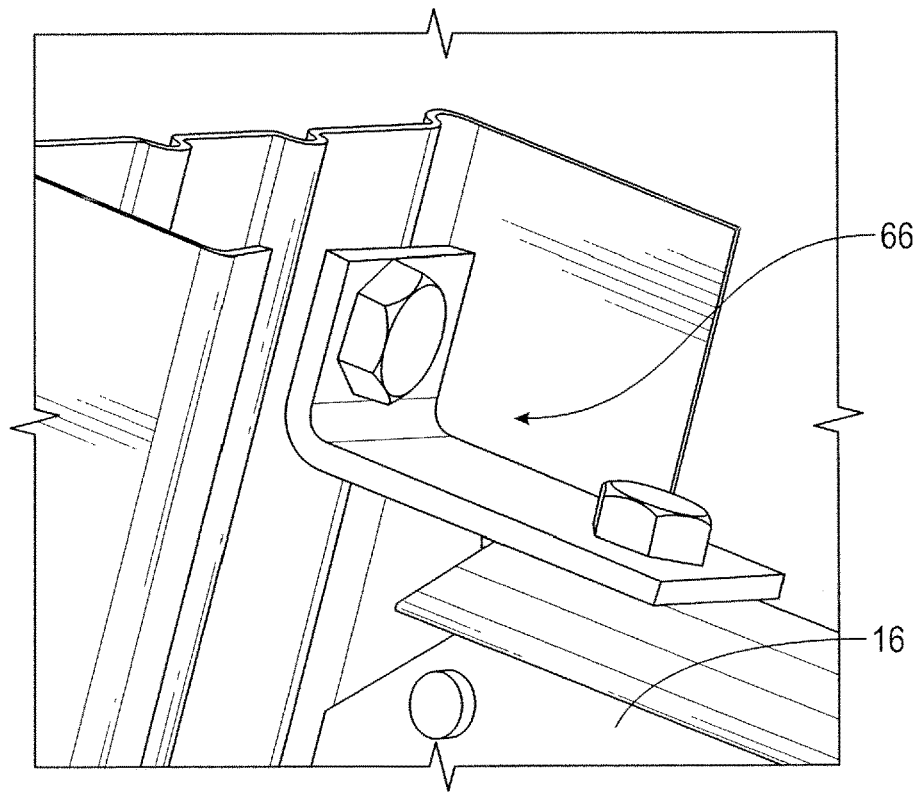
FIG. 9 is a perspective view of the foldable cable tray with the L-bracket with channel nut and bolts as a locking device.
Figure 10:
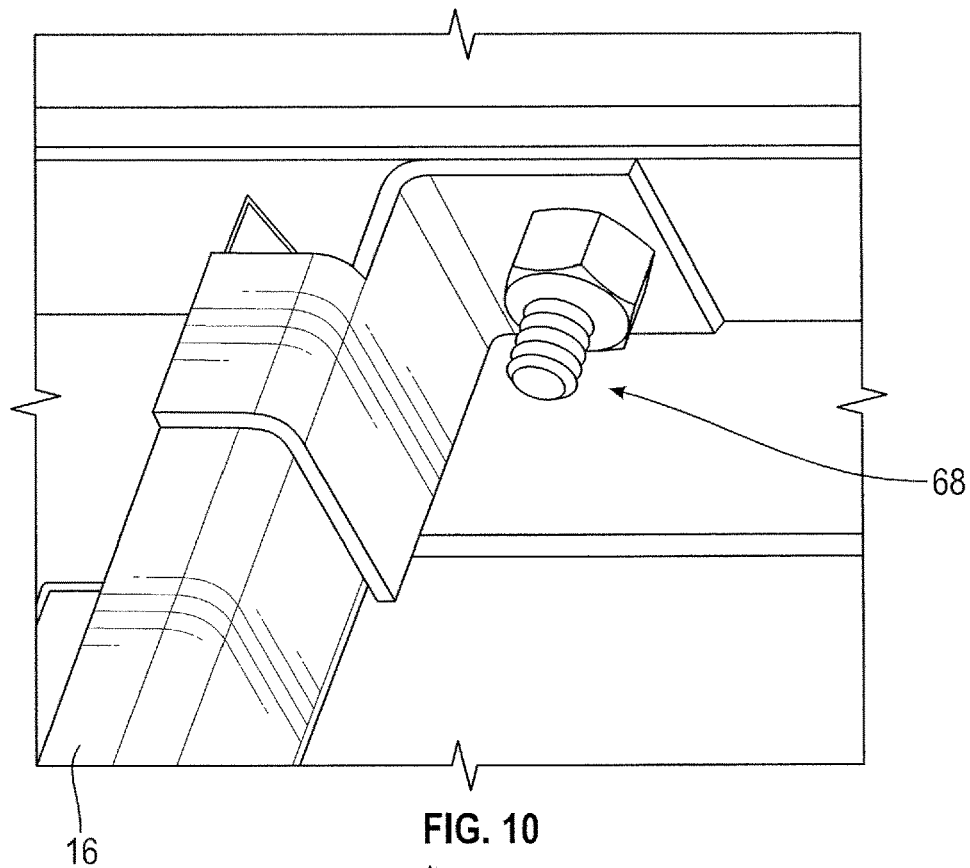
FIG. 10 is a perspective view of the foldable cable tray with the L-bracket with securing flange as a locking device.
Figure 11:
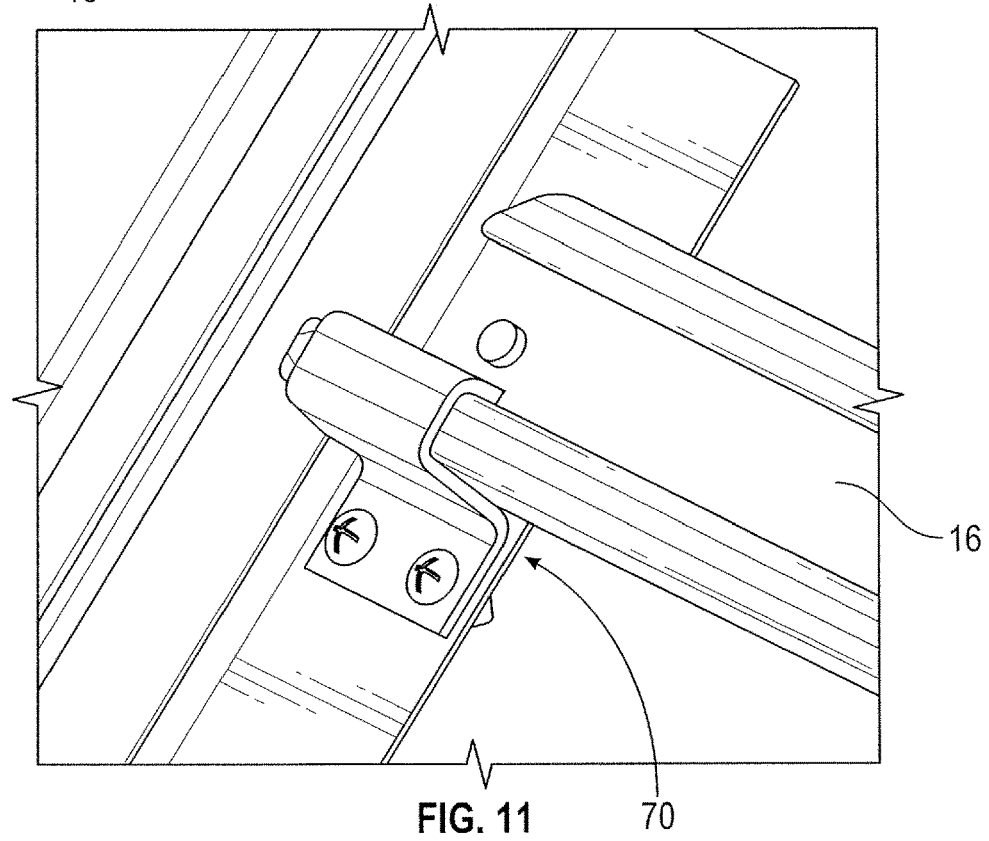
FIG. 11 is a perspective view of the foldable cable tray with the locking clamp with bolt and nut as a locking device.
Figure 12:
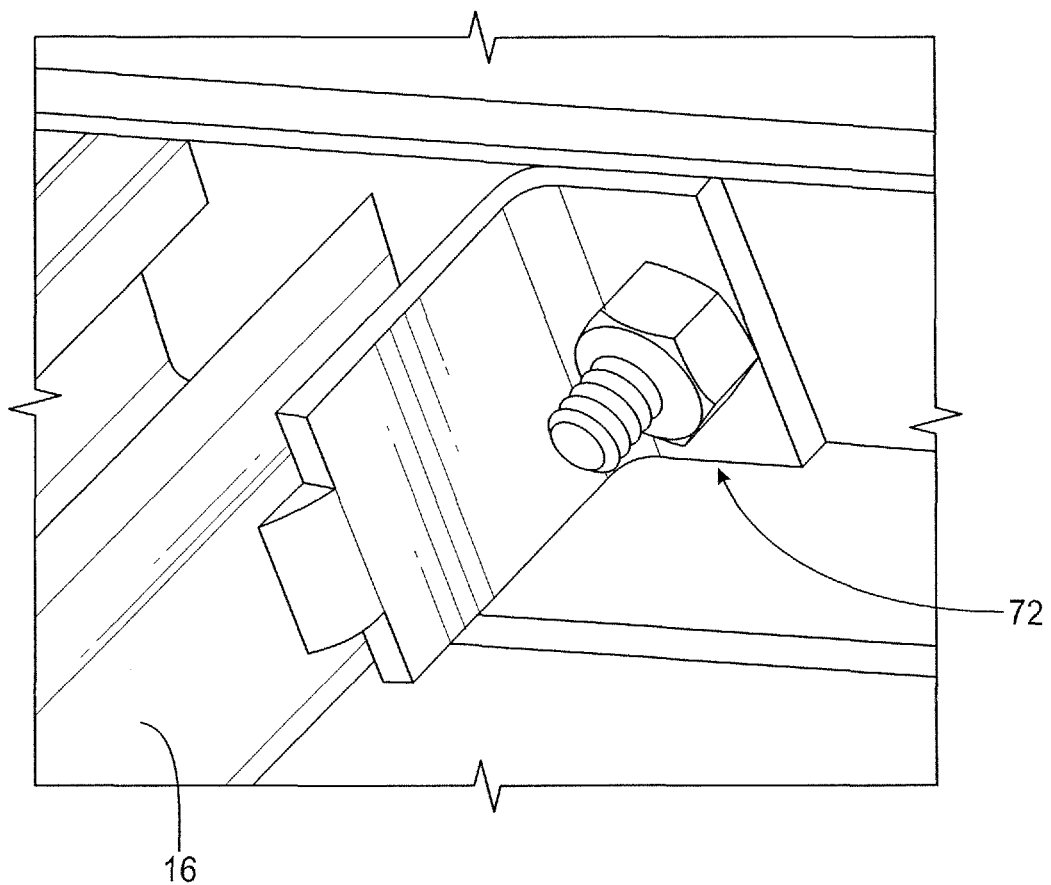
FIG. 12 is a perspective view of the foldable cable tray with the L-bracket with locking tab as a locking device.

In the depicted embodiment, as shown in FIG. 5, the foldable cable tray 10 is designed and configured to include a locking pin 58 as the locking device 18. Alternately, a variety of other designs and configurations for the locking device 18 could be implemented within the foldable cable tray 10. For example, the foldable cable tray 10 can be configured to include a bolt and nut device (FIG. 6) 60, locking rod device (FIG. 7) 62, locking tab device (FIG. 8) 64, L-bracket with channel nut and bolts device (FIG. 9) 66, L-bracket with securing flange device (FIG. 10) 68, locking clamp with bolt and nut device (FIG. 11) 70, or L-bracket with locking tab device (FIG. 12) 72.

The first side rail 12, second side rail 14 and plurality of rungs 16 are made of one or more materials having suitable properties for a desired application, including strength, weight, rigidity, etc. Metal is generally preferred. Additionally, while each side rail 12, 14 is preferably in I-shape, it will be appreciated that other designs and configurations could be used for each side rail 12, 14 such as a C-shape or Z-shape, as deemed suitable for a given application factors. The first side rail 12, second side rail 14, and web 20 have substantially flat surfaces. The first and second side rails 12, 14 are substantially identical. Additionally, the upper and lower flanges 26, 28 are substantially identical.

In use of the foldable cable tray 10, first, the foldable cable tray 10 is arranged in the unfolded position such that the plurality of rungs 16 are perpendicular to each of the first and second side rails 12, 14. Then, an installer adjusts the plurality of rungs 16 to set a desired width of the foldable cable tray 10 by extending or retracting the plurality of rungs 16. Once the installer has set the desired width, the locking device 18 is applied to secure the plurality of rungs 16 to the first and second side rails 12, 14 in a fixed manner.

From the foregoing, it will be appreciated that a foldable cable tray according to the present invention allows the foldable cable tray to be shipped efficiently and conveniently, while reducing space needed for transportation.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. A foldable cable tray comprising:
   a first side rail;
   a second side rail, the second side rail parallel to the first side rail;
   a plurality of rungs movably connected to the first and second side rails to transit the foldable cable tray between unfolded and folded positions, each of the plurality of rungs includes:
      a first rung member having opposite ends; and
      a second rung member having opposite ends, the second rung member slidably mounted within the first rung member for telescopic movement such that each of the plurality of rungs can be retracted or extended; and
   a locking device configured to lock each of the plurality of rungs to the first and second side rails when the foldable cable tray is in the unfolded position,
   wherein each of the plurality of rungs is movably attached at a first end portion of the first rung member and a second end portion of the second rung member to the first and second side rails, respectively,
   wherein a first rung mounting hole, a first rung locking hole, and a first angular cut are defined at the first end portion of the first rung member, and
   wherein a second rung mounting hole, a second rung locking hole, and a second angular cut are defined at the second end portion of the second rung member.

2. The foldable cable tray of claim 1, wherein a movement device is inserted through each of the first and second rung mounting holes to attach each of the plurality of rungs to the first and second side rails, enabling pivotal movement of each of the plurality of rungs therewith.

3. The foldable cable tray of claim 2, wherein the movement device is a riveted joint or the likes.

4. The foldable cable tray of claim 1, wherein the locking device is a locking pin, bolt and nut, locking rod, locking tab, L-bracket with channel nut and bolt, L-bracket with securing flange, locking clamp with bolt and nut, or L-bracket with locking tab.

5. The foldable cable tray of claim 1, wherein, in the unfolded position, the plurality of rungs are substantially perpendicular to each of the first and second side rails.

6. The foldable cable tray of claim 1, wherein, in the folded position, the plurality of rungs are near parallel to each of the first and second side rails.

7. A foldable cable tray comprising:
a first side rail;
a second side rail, the second side rail parallel to the first side rail;
a plurality of rungs movably connected to the first and second side rails to transit the foldable cable tray between unfolded and folded positions; and
a locking device configured to lock each of the plurality of rungs to the first and second side rails when the foldable cable tray is in the unfolded position,
wherein each of the first and second side rails includes a web having first and second ends, an upper flange disposed at the first end of the web, and a lower flange disposed at the second end of the web, and
wherein the upper and lower flanges are substantially perpendicular to the web.

8. The foldable cable tray of claim 7, wherein the lower flange defines a plurality of lower flange mounting holes through which the movement device is inserted from the bottom of each of the plurality of lower flange mounting holes to provide pivotal movement for the plurality of rungs.

9. The foldable cable tray of claim 8, wherein the lower flange defines a plurality of lower flange locking holes through which the locking device is inserted to lock the plurality of rungs to the first and second side rails.

10. The foldable cable tray of claim 9, wherein each of the lower flange locking hole is positioned closely adjacent to each corresponding lower flange mounting hole.

11. The foldable cable tray of claim 8, wherein the plurality of lower flange mounting holes are uniformly spaced apart at a predetermined interval across the entire length of the lower flange.

12. The foldable cable tray of claim 9, wherein the plurality of lower flange locking holes are uniformly spaced apart at a predetermined interval across the entire length of the lower flange.

13. The foldable cable tray of claim 7, wherein a shoulder is formed integrally from the inner surface of the web between the upper and lower flanges and extends across the entire length of the web.

14. A method of installing the foldable cable tray of claim 1, the method comprising:
unfolding the foldable cable tray;
adjusting a plurality of rungs to set a desired width of the foldable cable tray by retracting or extending the plurality of rungs; and
applying a locking device to affix the plurality of rungs to side rails.

15. The method of claim 14, wherein the plurality of rungs are telescopic.

16. The method of claim 14, wherein the locking device is a locking pin, bolt and nut, locking rod, locking tab, L-bracket with channel nut, and bolt, L-bracket with securing flange, locking clamp with bolt and nut, or L-bracket with locking tab.

* * * * *